(12) United States Patent
Mantzel

(10) Patent No.: US 8,657,042 B2
(45) Date of Patent: Feb. 25, 2014

(54) WALKING MACHINE

(75) Inventor: Jaimie Hartwig Barrett Mantzel, S. Royalton, VT (US)

(73) Assignee: China Industries Limited (GB)

( * ) Notice: Subject to any disclaimer, the term of this patent is extended or adjusted under 35 U.S.C. 154(b) by 173 days.

(21) Appl. No.: 12/897,561

(22) Filed: Oct. 4, 2010

(65) Prior Publication Data

US 2012/0080242 A1    Apr. 5, 2012

(51) Int. Cl.
*B62D 57/02*    (2006.01)

(52) U.S. Cl.
USPC ............... 180/8.1; 180/7.1; 180/8.2; 180/8.5; 180/8.6

(58) Field of Classification Search
USPC ................... 180/8.1, 7.1, 8.2, 8.5, 8.6
See application file for complete search history.

(56) References Cited

U.S. PATENT DOCUMENTS

| | | | |
|---|---|---|---|
| 2,827,735 A | 3/1958 | Grimm, Jr. | |
| 3,331,463 A * | 7/1967 | Kramer | 180/8.6 |
| 4,216,612 A | 8/1980 | Erickson et al. | |
| 4,527,650 A * | 7/1985 | Bartholet | 180/8.6 |
| 4,558,758 A * | 12/1985 | Littman et al. | 180/8.1 |
| 4,629,440 A * | 12/1986 | McKittrick et al. | 446/356 |
| 4,662,465 A * | 5/1987 | Stewart | 180/8.1 |
| 4,708,690 A * | 11/1987 | Kulesza et al. | 446/351 |
| 4,738,583 A | 4/1988 | Macconochie et al. | |
| 4,790,400 A | 12/1988 | Sheeter | |
| 5,005,658 A * | 4/1991 | Bares et al. | 180/8.1 |
| 5,121,805 A | 6/1992 | Collie | |
| 5,127,484 A * | 7/1992 | Bares et al. | 180/8.1 |
| 5,219,410 A * | 6/1993 | Garrec | 180/8.1 |
| 5,351,626 A | 10/1994 | Yanagisawa | |
| 5,351,773 A * | 10/1994 | Yanagisawa | 180/8.5 |
| 5,423,708 A * | 6/1995 | Allen | 446/356 |
| 5,574,347 A | 11/1996 | Neubauer | |

(Continued)

FOREIGN PATENT DOCUMENTS

| | | |
|---|---|---|
| CN | 1045737 A | 10/1990 |
| CN | 1164491 A | 11/1997 |

(Continued)

OTHER PUBLICATIONS

International Search Report and Written Opinion dated Feb. 27, 2012 from International Patent Application No. PCT/GB2011/051880, filed Oct. 4, 2011 (12 pages).

(Continued)

*Primary Examiner* — Kevin Hurley
*Assistant Examiner* — Michael Stabley
(74) *Attorney, Agent, or Firm* — Schmeiser, Olsen & Watts LLP

(57) ABSTRACT

A steerable walking machine is described which comprises a leg mechanism that provides a means for locomotion of the machine across a surface and a head rotatably mounted upon the leg mechanism. The rotational position of the head upon the leg mechanism acts to defines a direction of locomotion of the machine across the surface. The steerable walking machine can therefore walk in any direction without requiring the leg mechanism to turn and so can maneuver in more confined spaces than those devices known in the art. A first motor is employed to control the leg mechanism while a second motor controls the rotation of the head upon the leg mechanism. The functionality of the steerable walking machine is therefore achieved through the employment of only two motors thus significantly reducing the manufacturing costs involved.

25 Claims, 5 Drawing Sheets

(56) References Cited

U.S. PATENT DOCUMENTS

| | | | |
|---|---|---|---|
| 5,685,383 A * | 11/1997 | Ferrante | 180/8.6 |
| 5,762,153 A * | 6/1998 | Zamagni | 180/8.6 |
| 5,842,533 A | 12/1998 | Takeuchi | |
| 5,857,533 A | 1/1999 | Clewett | |
| 6,238,264 B1 | 5/2001 | Kazami et al. | |
| 6,260,862 B1 * | 7/2001 | Klann | 280/28.5 |
| 6,652,352 B1 | 11/2003 | Macarthur | |
| D512,086 S | 11/2005 | Dirks | |
| D576,217 S | 9/2008 | Pasko | |
| 7,600,592 B2 * | 10/2009 | Goldenberg et al. | 180/9.1 |
| 2001/0054518 A1 | 12/2001 | Buehler et al. | |
| 2002/0025756 A1* | 2/2002 | Nishikawa | 446/431 |
| 2002/0060267 A1* | 5/2002 | Yavnai | 244/23 A |
| 2004/0063382 A1 | 4/2004 | Randall | |
| 2008/0249660 A1 | 10/2008 | Nakamura | |

FOREIGN PATENT DOCUMENTS

| | | | |
|---|---|---|---|
| CN | 201258034 Y | 6/2009 | |
| CN | 201291928 Y | 8/2009 | |
| CN | 101602382 A | 12/2009 | |
| EP | 0185821 A | 7/1986 | |
| EP | 0401120 A | 12/1990 | |
| JP | 60104474 A | 6/1985 | |
| JP | 62251284 A | 11/1987 | |
| JP | 63275486 A | 11/1988 | |
| JP | 2180571 A | 7/1990 | |
| KR | 20030018780 A | 3/2003 | |
| RO | 114247 B1 | 2/1999 | |
| SU | 418366 A1 | 3/1974 | |
| SU | 1782849 A | 12/1992 | |
| WO | 9727097 A | 7/1997 | |
| WO | 2007056239 A | 5/2007 | |

OTHER PUBLICATIONS

Combined Search and Examination Report dated Feb. 15, 2011 from United Kingdom Patent Application No. GB1018566.8, filed Nov. 3, 2010 (7 pages).

Jaimie Mantzel, "My proposal to toy companies," YouTube, Feb. 1, 2010, URL:http://www.youtube.com/watch?v=sqYiNWUZiVA (1 page).

Jaimie Mantzel, "Spider Tank . . . extended. Explination," YouTube, Dec. 1, 2009, XP002668434, URL:http://www.youtube.com/watch?v=NJjX_YbqTC4 (1 page).

Jaimie Mantzel, "Spider Tank," YouTube, Dec. 26, 2008, XP002668435, URL:http://www.youtube.com/watch?v=_6gpS0jtB2E (1 page).

* cited by examiner

WALKING MACHINE

BACKGROUND OF THE INVENTION

1. The Field of the Invention

The present invention relates to the field of machines adapted for locomotion across a surface. More specifically, the present invention relates to a legged walking machine that is steerable so enabling it to change direction of locomotion across the surface.

2. The Relevant Technology

Legged walking machines are known in the art. In particular, there exist numerous examples of six legged walking machines, commonly referred to as "hexapods", known in the art. These machines can generally be split into two distinct categories.

The first category relates to those machines that exhibit a relatively simple design i.e. those that employ a single motor to operate all of the legs. As such these walking machines are only capable of travelling in straight lines which significantly limits their manoeuvrability and, when in the form of a toy, their playability. Some examples of such six legged walking machines are described in U.S. Pat. No. 6,652,352 B, Romanian Patent No. 114,247 B and Chinese Patent Publication No. 201291928 Y.

The second category relates to those machines that exhibit a significantly more complex design i.e. those that employ at least one motor or servo to control the operation of each leg and each these components is linked to a microprocessor. These walking machines are capable of steerable locomotion across a surface however the use of multiple motors makes them prohibitively expensive to produce and they generally require not insignificant levels of computing power to provide the required directional control. An example of such a steerable walking machine is described within U.S. Pat. No. 5,005,658, U.S. Pat. Nos. 5,351,626 A and 5,351,773 A.

It is recognised in the present invention that considerable advantage is to be gained in the provision of a walking machine that provides a motor efficient means of for locomotion and steering across a surface.

It is therefore an object of an aspect of the present invention to obviate or at least mitigate the foregoing disadvantages of the walking machines known in the art.

BRIEF SUMMARY OF THE INVENTION

According to a first aspect of the present invention there is provided a steerable walking machine the steerable walking machine comprising a leg mechanism that provides a means for locomotion of the machine across a surface and a head rotatably mounted upon the leg mechanism wherein the rotational position of the head upon the leg mechanism defines a direction of locomotion of the machine across the surface.

The steerable walking machine described above provides a device that can walk in any direction without having to turn the leg mechanism. This is achieved since it is the head's rotational position on the leg mechanism which defines the direction of travel. Thus as the legs mechanism remains stationary direction of locomotion can be rotated through 360°. As a result the steerable walking device can manoeuvre in more confined spaces than those devices known in the art.

The leg mechanism may comprise two or more flexible legs the operation of which is controlled by a first leg operating mechanism. Preferably the flexible legs controlled by the first leg operating mechanism are equally spaced around the leg mechanism.

The leg mechanism may comprise two or more flexible legs the operation of which is controlled by a second leg operating mechanism. Preferably the flexible legs controlled by the second leg operating mechanism are equally spaced around the leg mechanism.

The flexible legs controlled by the first and second leg operating mechanism are preferably alternatively located around the leg mechanism.

Preferably the first leg operating mechanism acts to rotate a surface engaging end of the flexible legs. It is also preferable for the second leg operating mechanism to rotate a surface engaging end of the flexible legs. The rotation of the surface engaging ends of the flexible legs provided by the first and second leg operating mechanisms are preferably of the same sense. Most preferably the rotation of the surface engaging ends of the flexible legs provided by the first and second leg operating mechanisms are preferably half of one cycle out of step with each other. With this arrangement the flexible legs provide a stable means for locomotion of the device across a surface since there some of surface engaging ends of the flexible legs are always in contact with the ground.

Most preferably the first and second leg operating mechanisms are driven by a first motor. The rotational position of the head upon the leg mechanism is preferably controlled by a second motor. The functionality of the steerable walking machine is therefore achieved through the employment of only two motors, one employed for locomotion and the other employed for steering. The use of only two motors and associated electronics significantly reduces the manufacturing costs involved.

In a preferred embodiment the leg mechanism comprises three flexible legs the operation of which is controlled by the first leg operating mechanism.

In a preferred embodiment the leg mechanism comprises three flexible legs the operation of which is controlled by the second leg operating mechanism.

Preferably the head comprise a support frame having a perimeter section and a rotatable disc located therein. The support frame may further comprise two or more fixed legs depending from the perimeter section which provide an attachment means for the flexible legs. Preferably the flexible legs are pivotally attached to the two or more fixed legs. The support frame may further comprise two or more attachment points located on the perimeter. The attachment points provide a second attachment means for the flexible legs the operation of which is controlled by the second leg operating mechanism.

Most preferably a locomotion control mechanism is mounted on top of the rotatable disc. The locomotion control mechanism preferably comprises a lever drive mechanism arranged to pass through an aperture in the rotatable disc.

Preferably the lever drive mechanism is pivotally mounted to a support structure located upon the rotatable disc.

A multi armed joint mechanism is preferably attached to a distal end of the lever drive mechanism. The multi armed joint mechanism preferably comprises an arm suitable for attachment to each flexible leg. Most preferably the first and second leg operating mechanisms are configured to translate movement of the multi-armed joint to each of surface engaging ends of the flexible legs.

Most preferably the lever drive mechanism is arranged to rotate relative to the multi armed joint mechanism upon rotation of the rotatable disc. Rotation of the rotatable disc therefore defines the direction of locomotion of the walking machine.

The steerable walking machine may comprise one or more additional accessories selected from the group of accessories comprising a suction dart gun, a crane and a magnetic pickup.

The head may also accommodate a one or more light sensors. This increases the playability of for the steerable walking device since the head can rotate to aim at targets, and simultaneously walk directly towards them.

According to a second aspect of the present invention there is provided a method of controlling the operation of a steerable walking machine the method comprising the steps of:

employing a leg mechanism to provide locomotion to the walking machine; and selecting a rotational position of a head mounted upon the leg mechanism so as to define the direction of locomotion of the walking machine.

The step of employing a leg mechanism to provide locomotion preferably employs a first motor to drive four or more flexible legs.

Preferably the rotational position of the head mounted upon the leg mechanism is controlled by a second motor.

Embodiments of the second aspect of the invention may comprise features to implement the preferred or optional features of the first aspect of the invention or vice versa.

These and other objects and features of the present invention will become more fully apparent from the following description and appended claims, or may be learned by the practice of the invention as set forth hereinafter.

BRIEF DESCRIPTION OF THE DRAWINGS

Aspects and advantages of the present invention will become apparent upon reading the following detailed description and upon reference to the following drawings in which.

DETAILED DESCRIPTION OF THE PREFERRED EMBODIMENTS

Figure 1:
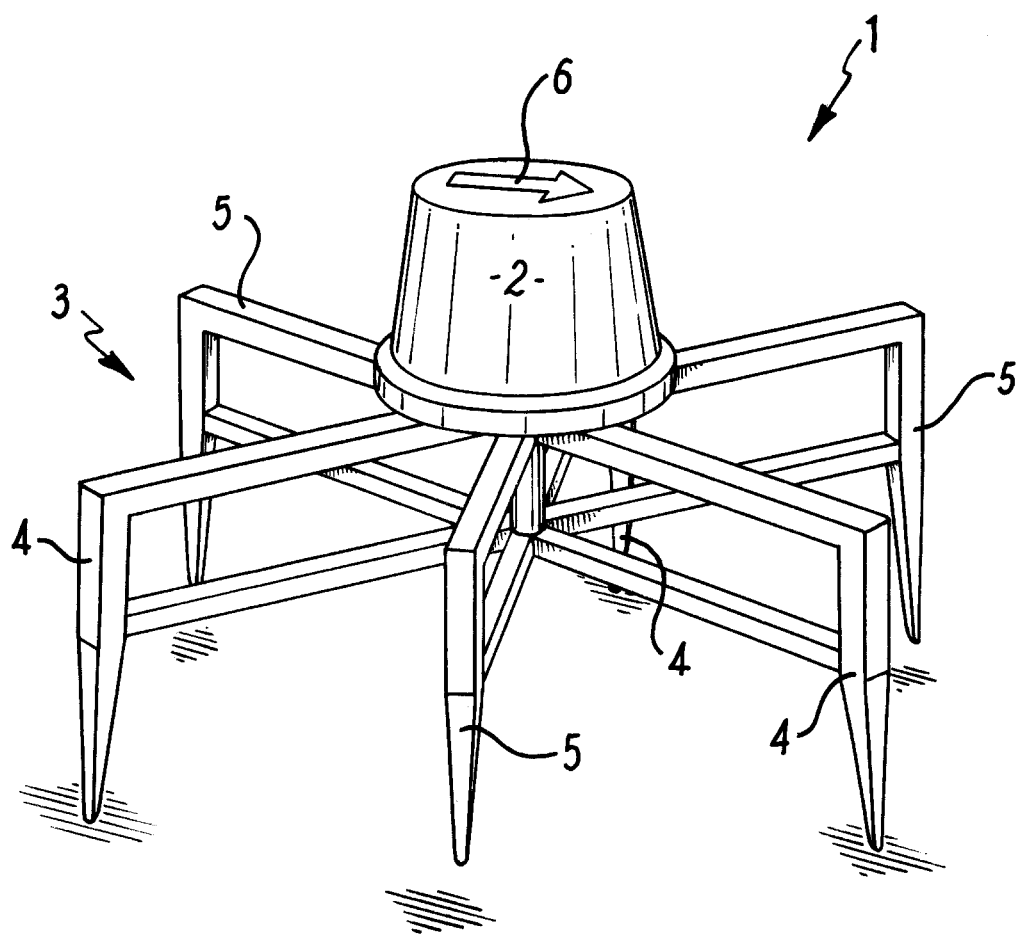
FIG. 1 presents a schematic representation of a steerable walking machine in accordance with an embodiment of the present invention.

A schematic representation of a steerable walking machine 1 in accordance with an embodiment of the present invention is presented in FIG. 1. The steerable walking machine can be seen to comprise a head 2 that is mounted in a rotatable manner upon a leg mechanism 3. The steerable walking machine 1 presented in FIG. 1 may be considered to be a "hexapod" since the leg mechanism 3 comprises six flexible legs, three flexible legs having a first operating mechanism 4 and three flexible legs having a second operating mechanism 5. Each set of flexible legs are located substantially 120° apart on the leg mechanism 3 such that there is a flexible leg of alternative type every 60° around the leg mechanism 3.

It will be apparent to the skilled man on reading the following description that the steerable walking machine 1 is not limited to comprising six flexible legs 4. Embodiments comprising as few as four flexible legs may be produced while the upper limit of flexible legs is limited only by the physical dimensions of steerable walking machine 1.

In all of the described embodiments the leg mechanism 3 provides for locomotion of the steerable walking device 1 across a surface. It is the relative rotational position between the head 2 and the leg mechanism 3 which defines the direction of locomotion across the surface, as indicated by the arrow 6 within FIG. 1.

Further details of the steerable walking device 1 will now be described with reference to FIG. 2 which presents a partially exploded view of the head 2, and FIG. 3 which presents a top view of the steerable walking device 1 with a head cover removed. The head 2 can be seen to comprise a support frame 7 having a circular perimeter 8 depending from which are three fixed legs 9 and mounted centrally therein is a rotatable disc 10.

Each fixed leg 9 comprises a foot 11 pivotally mounted to which are first 12 and second 13 leg attachment joints. The pivotally mounted first 12 and second 13 leg attachment joints are configured to allow for rotational movement of an associated flexible leg 4 and 5, respectively, about substantially perpendicular axes. In the embodiment shown in FIG. 2 first substantially vertical axes are defined by first pivot pins 14 that located within apertures within the associated foot 11 while second substantially horizontal axes are defined by second pivot pins 15 housed within the leg attachment joints 12 and 13 themselves.

Three similarly designed third leg attachment joints 16 are also located on the underside of the circular perimeter 8. These attachment joints provide a means for attaching the flexible legs 5 to the support frame 7, as described in further detail below.

Located on top of the rotatable disc 10 is a locomotion control mechanism 17. The locomotion control mechanism 17 comprises a support structure 18 that extends from the rotatable disc 10 and a lever drive mechanism 19 which is arranged to pass through a central aperture in the rotatable disc 10. The lever drive mechanism 19 is pivotally mounted at its proximal end to a first end of a pivot arm 20 while a second end of the pivot arm 20 is pivotally mounted to a distal end of the support structure 18.

At a distal end of the lever drive mechanism 19 is located a Y-shaped mount 21 that is pivotally attached to a six armed joint mechanism 22. It can be seen that the six armed joint mechanism 22 comprises a central rod 23 threaded onto which is a first 24 and second 25 three armed connector. Each arm of the first three armed connector 24 provides a means of attachment for a flexible leg 4 to the lever drive mechanism 19 while each arm of the second three armed connector 25 provides a means of attachment for a flexible leg 5 to the lever drive mechanism 19. The central rod 23 is arranged so that the first 24 and second 25 three armed connectors mimic any horizontal or vertical movement of the rod 23. However, the rod 23 is configured so as to be able to freely rotate upon its own axis within the first 24 and second 25 three armed connectors.

Operation of the locomotion control mechanism 17 is achieved through the employment of a first electric motor 26 that is mounted on the rotatable disc 10 and which is mechanically connected to the lever drive mechanism 19 via a first gearing mechanism 27. The first gearing mechanism 27 comprises a first gear wheel 28 located on the rotatable disc 10 and which is configured to drive a second gear wheel 29 mounted on the lever drive mechanism 19. As a result, when the first electric motor 26 is operated it acts to rotate the second gear wheel 29 and thus the six armed joint mechanism 22 in the same vertical plane as indicated by the arrows R1 and R2, respectively. At this time however the proximal end of the lever drive mechanism 19 is restricted to substantially linear movement along its own longitudinal axis, as indicated by arrow 30 of FIG. 2.

Figure 2:
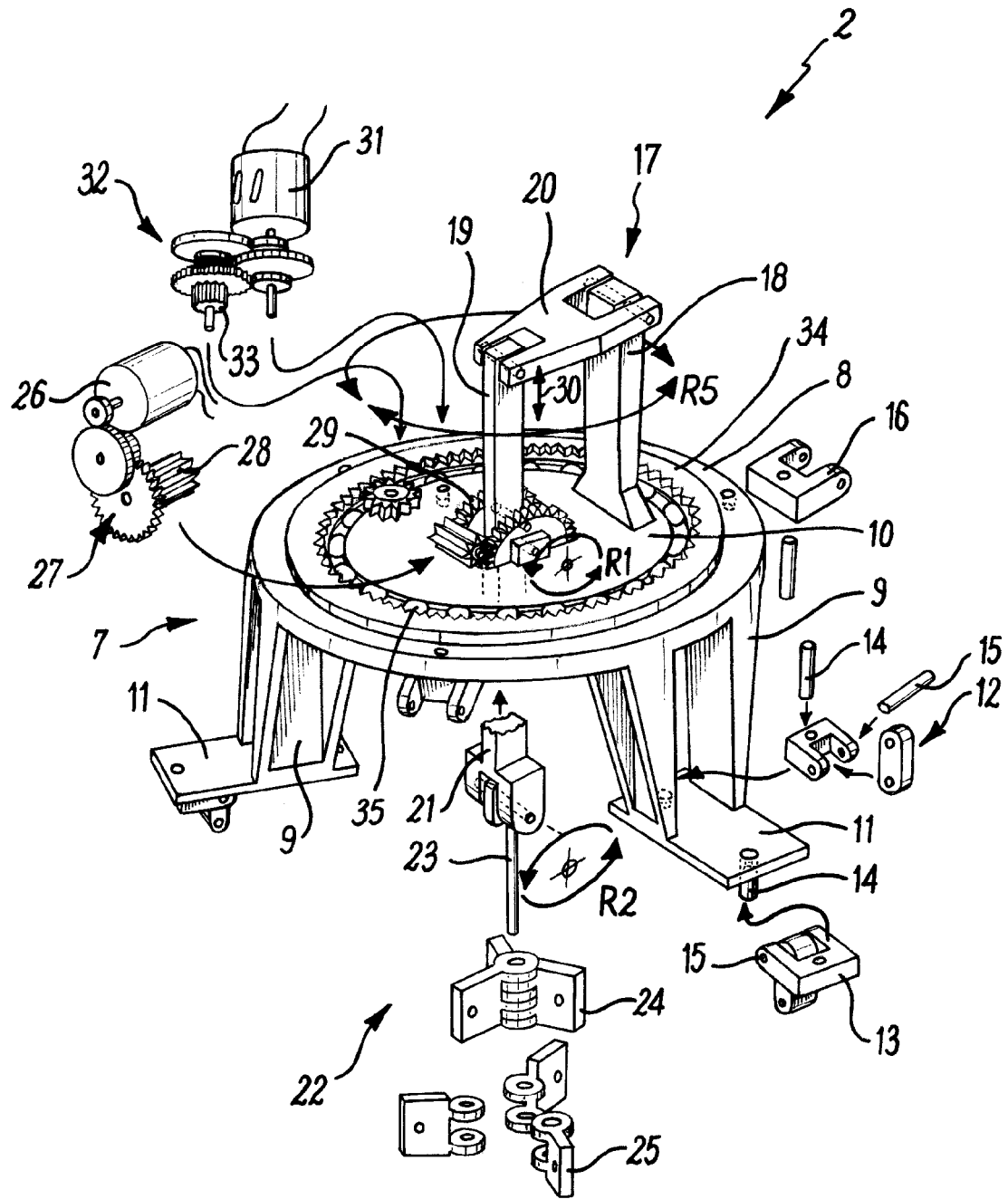
FIG. 2 presents a partially exploded view of a head of the steerable walking machine of FIG. 1.
Figure 3:
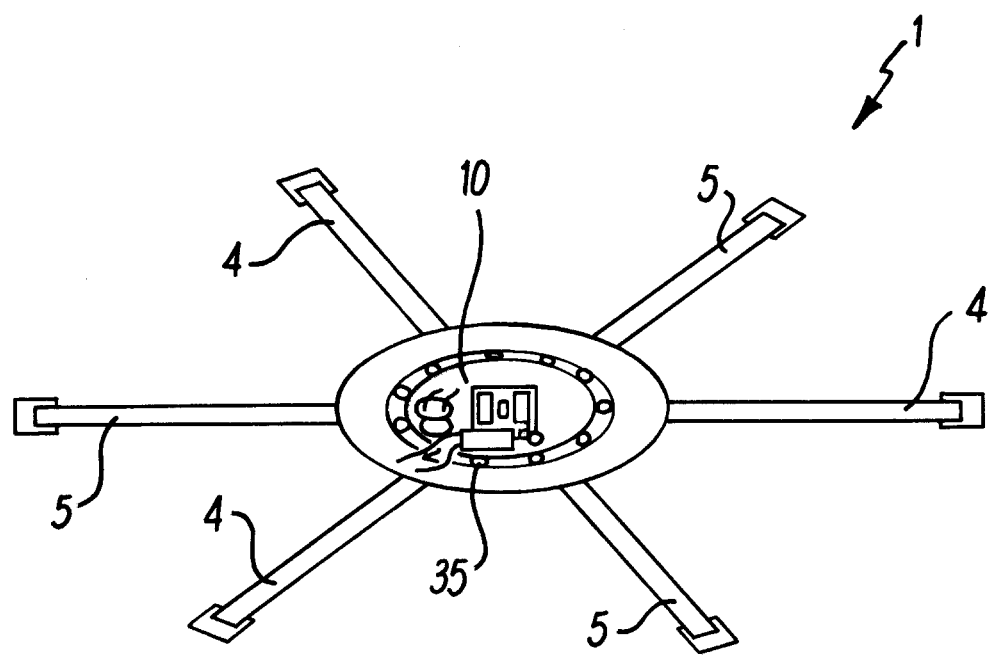
FIG. 3 presents a top view, with a head cover removed, of the steerable walking machine of FIG. 1.

The relative rotational position between the head 2 and the leg mechanism 3, indicated by the arrows R5 within FIG. 2, is controlled through the employment of a second electric motor 31 that is mounted on the rotatable disc 10 and which is mechanically connected to the circular perimeter 8 of the support frame 7 via a second gearing mechanism 32. The second gearing mechanism 32 comprises a third gear wheel 33 located on the rotatable disc 10 and configured to interact with a circular toothed gear 34 located around the circular perimeter 8 of the support frame 7. Ball bearings 35 are located between the rotatable disc 10 and the circular perimeter 8 of the support frame 7 so as to assist the rotational movement of the head 2.

Further detail of the operating mechanism for the first flexible legs 4 will now be described with reference to FIG. 4. The flexible legs 4 can be seen to comprise a first leg lever 36 the proximal end of which is attached to an arm of the first three armed connector 24 and a distal end of which is attached to a surface engaging leg lever 37. The first leg lever 36 is pivotally attached to a first leg attachment joint 12. A second leg lever 38 pivotally attaches the surface engaging leg lever 37 to the first leg attachment joint 12.

Figure 4:
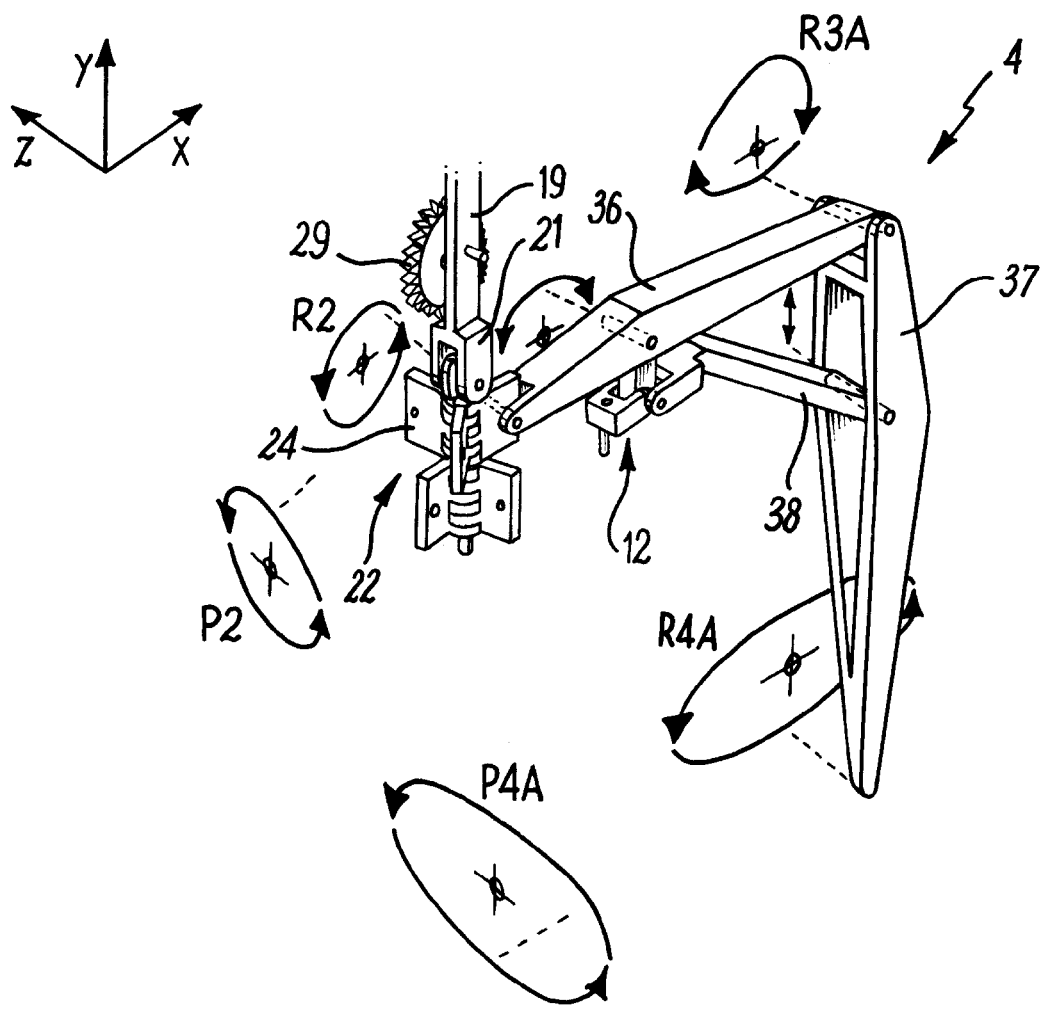
FIG. 4 presents a schematic representation of a first leg operating mechanism for the steerable walking machine of FIG. 1.

In FIG. 4, the Y-shaped mount 21 is shown aligned with the longitudinal axis of the first leg lever 36 i.e. both lie along the x-axis (see insert). With this arrangement operation of the first electric motor 26 acts to rotate the proximal end of the first leg lever 36 as represented by arrows R2, as described above. As the proximal end of the first leg lever 36 moves it pivots about the first leg attachment joint 12 in a similar manner to a seesaw causing the distal end of the first leg lever 36, and thus the non surface engaging end of the surface engaging leg lever 37, to rotate in the opposite sense to the proximal end of the first leg lever 36, as represented by arrows R3A.

The surface engaging leg lever 37 is arranged to pivot about its point of connection with the second leg lever 38, again in a similar manner to a seesaw. As a result, the rotational motion of the non surface engaging end of the surface engaging leg lever 37 acts to rotate the surface engaging end this leg lever 37 in the opposite sense, as represented by arrows R4A. It should be noted that the surface engaging end of this leg lever 37 rotates with the same sense as the proximal end of the first leg lever 36 i.e. R2 has the same rotational sense as R4A. However, an important point to note is that although the rotational senses of R2 and R4A are the same they are offset by half of one rotation.

If the Y-shaped mount 21 is rotated through 90° i.e. so as to be aligned with the z-axis (see insert) then rotation the operation of the first electric motor 26 acts to rotate the proximal end of the first leg lever 36 as represented by arrows P2. The first leg lever 36 is therefore driven like an oar of a rowing boat causing the surface engaging end of the surface engaging leg lever 37 to rotate with the same sense as represented by the arrows P4A. An important point to note is that although the rotational senses of P2 and P4A are the same they are again offset by half of one rotation.

The walking motion induced on the surface engaging end of surface engaging leg lever 37 can be considered as resulting from vector addition of the above described x-axis and z-axis motions. The magnitude of these components is determined by the rotational movement of the proximal end of the first leg lever 36 and the operating angle of Y-shaped mount 21 relative to the y-axis (see insert), and hence the operating angle of the lever drive mechanism 19. The rotational movement of the surface engaging end of the surface engaging leg lever 37 is always in the same sense as the rotation of the proximal end of the first leg lever 36 but is always offset by half of one rotation.

Further detail of the operating mechanism for the second flexible legs 5 will now be described with reference to FIG. 5. The second flexible legs 5 can be seen to comprise a substantially Y-shaped leg lever 39 a first proximal end of which is attached to an arm of the second three armed connector 25 and a second proximal end of which is pivotally attached to second leg attachment joint 13. A distal end of the Y-shaped leg lever 39 is pivotally attached towards the middle of a surface engaging leg lever 37. Pivotally attached to the non-surface engaging end of the surface engaging leg lever 37 is a third leg lever 40. The proximal end of the third leg lever 40 is pivotally attached to a third leg attachment joint 16 located on the underside of the circular perimeter 8.

Pivotal attachment between the non-surface engaging end of the surface engaging leg lever 37 and the third leg lever 40 is desirable because of the fact that the stationary pivot point provide by attachment joint 16 is not on the same vertical axis as the pivot point provided by second leg attachment joint 13 for the Y-shaped leg lever 39.

Figure 5:
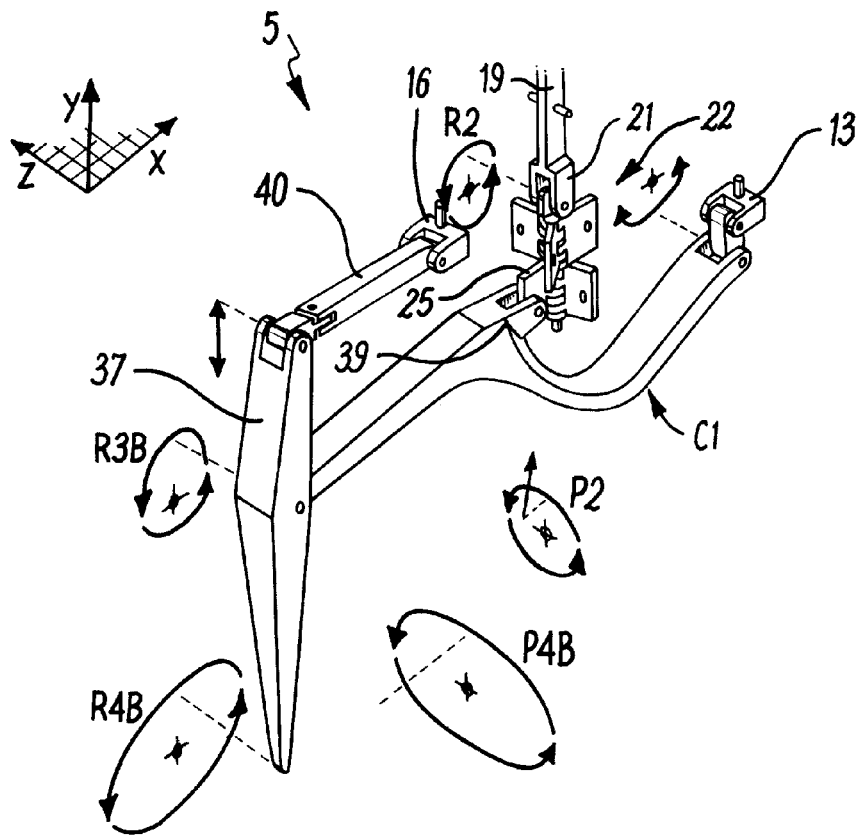
FIG. 5 presents a schematic representation of a second leg operating mechanism for the steerable walking machine of FIG. 1.

In FIG. 5, the Y-shaped mount 21 is again shown aligned along the x-axis (see insert). With this arrangement operation of the first electric motor 26 acts to rotate the first proximal end of the Y-shaped leg lever 39 as represented by arrows R2, and as described above. As the first proximal end of the Y-shaped leg lever 39 rotates it act to rotate the attachment point between the distal end of the Y-shaped leg lever 39 and the surface engaging leg lever 37, as represented by arrows R3B. It is noted that R2 and R3B exhibit the same rotational sense. The surface engaging leg lever 37 then pivots about its attachment point with the third leg lever 40 causing the surface engaging end of the surface engaging leg lever 37 to also rotate, as represented by arrows R4B. It is further noted that R4B has the same rotational sense as R2 and R3B.

If the Y-shaped mount 21 is rotated through 90° i.e. so as to be aligned with the z-axis (see insert) then rotation the operation of the first electric motor 26 acts to rotate first proximal end of the Y-shaped leg lever 39 as represented by arrows P2. The Y-shaped leg lever 39 therefore behaves like a sweeping broom causing the surface engaging end of the surface engaging leg lever 37 to rotate with the same sense as represented by the arrows P4B.

The walking motion induced on the surface engaging end of surface engaging leg lever 37 can again be considered as resulting from vector addition of the above described x-axis and z-axis motions. The magnitude of these components is determined by the rotational movement of the first proximal end of the Y-shaped leg lever 39 and the operating angle of Y-shaped mount 21 relative to the y-axis (see insert), and hence the operating angle of the lever drive mechanism 19. The rotational movement of the surface engaging end of the surface engaging leg lever 37 is always in the same sense as the rotation of the first proximal end of the Y-shaped leg lever 39.

Figure 6:
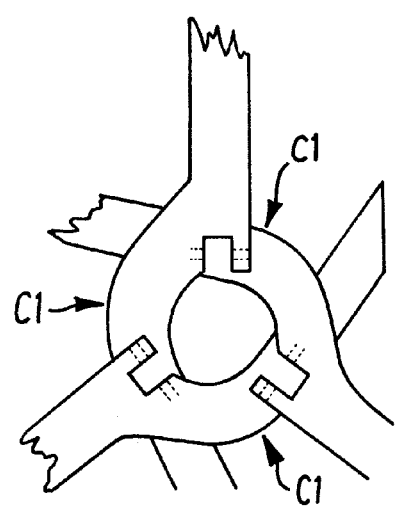
FIG. 6 presents a schematic representation of the cross over between three of the legs of the steerable walking machine of FIG. 1.

A point to note is that in order to allow the correct operation of all three of the second flexible legs 5 the arms of the Y-shaped mounts 21 that attach to the second leg attachment joints 13 are formed in the shape of curves, see C1, C2 and C3 as presented in FIG. 6. This provides the second flexible legs 5 with sufficient clearance to produce the above described movements necessary for walking.

Locomotion of the steerable walking device 1 is provided by the operation of the first electric motor 26. This acts to simultaneously drive all of the flexible legs 4 and 5 although these legs are always half of one cycle out of step with each other. This ensures that there are always three legs of the steerable walking device 1 in contact with the surface over which it is travelling so providing the device with the required stability.

The direction of travel of the steerable walking device 1 can be easily changed through the operation of the second electric motor 31. Operation of the second electric motor 31 acts to alter the relative rotational position between the head 2 and the leg mechanism 3 thus producing a corresponding change in direction for the steerable walking device 1. Thus instead of the entire device having to rotate to change direction, the steerable walking device 1 simply has to rotate the head 2 and whichever direction it faces becomes the front of the device. The legs mechanism 3 remains stationary while the machine rotates its locomotion direction through 360°. As a result the steerable walking device 1 can manoeuvre in more confined spaces than those devices known in the art.

It is preferable for all of the required electronics for the steerable walking device 1 (e.g. batteries, radio control units etc.) to be mounted within a central area of the head 2. This prevents the need for any wires to have to cross the ball bearings 35 thus allow for indefinite rotation between the head 2 and leg mechanism 3.

In alternative embodiments the head may also accommodate a variety of light sensors. This increases the playability of for the steerable walking device since the head can rotate to aim at targets, and simultaneously walk directly towards them.

Although the above steerable walking device 1 has been described as comprising a total of six flexible legs, three flexible legs of a first design and three flexible legs of a second design, it will be apparent to the skilled reader that the number of legs is not so limited. By way of example, in an alternative embodiment only two flexible legs of each design are employed. In this embodiment each set of flexible legs are located substantially 180° apart on the leg mechanism 3 such that there is a flexible leg of alternative type every 90° around the leg mechanism 3. To increase the stability of this embodiment of the device it is preferable for each flexible leg to comprise a foot so as to increase the area of contact between each flexible leg and the surface over which the device is moving.

In a yet further alternative embodiment more than three flexible legs of each design, suitably spaced around the around the leg mechanism 3 may be employed.

It is envisaged that the above described invention could be scaled to provide a full sized human driveable (or remote controlled) vehicle.

The steerable walking machine described above provides a device that can walk in any direction without having to turn. This functionality is achieved through the employment of only two electric motors, one employed for locomotion and the other employed for steering. The steerable walking machine therefore employs fewer electric motors, and associated electronics, than those devices known in the art. The use of only two electric motors retains the manoeuvrability and playability of the more expensive and complex prior art devices whilst employing a more simplified design.

As a result of the design of the device no reverse control is required to be incorporated. This means that the device can be controlled by fewer buttons or signals than is usually required for standard radio controlled toys. In an alternative embodiment normally reverse button or signal may be employed for an alternative accessory such as suction dart gun, a crane, a magnetic pickup, etc.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

What is claimed is:

1. A steerable walking machine comprising a leg mechanism that provides a means for locomotion of the machine across a surface and a head rotatably mounted upon the leg mechanism wherein the rotational position of the head upon the leg mechanism defines a direction of locomotion of the machine across the surface, wherein the head comprises a support frame having a perimeter section and a rotatable disc located therein.

2. A steerable walking machine as claimed in claim 1 wherein the support frame further comprises two or more fixed legs depending from the perimeter section which provide an attachment means for one or more flexible legs.

3. A steerable walking machine as claimed in claim 2 wherein flexible legs are pivotally attached to the two or more fixed legs.

4. A steerable walking machine as claimed in claim 1 wherein the support frame further comprise two or more attachment points located on the perimeter.

5. A steerable walking machine as claimed in claim 1 wherein a locomotion control mechanism is mounted on top of the rotatable disc.

6. A steerable walking machine as claimed in claim 5 wherein the locomotion control mechanism comprises a lever drive mechanism arranged to pass through an aperture in the rotatable disc.

7. A steerable walking machine as claimed in claim 6 wherein the lever drive mechanism is pivotally mounted to a support structure located upon the rotatable disc.

8. A steerable walking machine as claimed in claim 6 wherein a multi armed joint mechanism is attached to a distal end of the lever drive mechanism.

9. A steerable walking machine as claimed in claim 8 wherein the multi armed joint mechanism comprises an arm suitable for attachment to a flexible leg.

10. A steerable walking machine as claimed in claim 8 wherein the first and second leg operating mechanisms are configured to translate movement of the multi-armed joint surface engaging ends of four or more flexible legs.

11. A steerable walking machine as claimed in claim 8 wherein the lever drive mechanism is arranged to rotate relative to the multi armed joint mechanism upon rotation of the rotatable disc.

12. A steerable walking machine as claimed in claim 1 wherein the steerable walking machine comprises one or more accessories selected from the group of accessories comprising a suction dart gun, a crane and a magnetic pickup.

13. A steerable walking machine as claimed in claim 1 wherein the head accommodates one or more light sensors.

14. A steerable walking machine as claimed in claim 1 wherein the leg mechanism comprises two or more flexible legs the operation of which is controlled by a first leg operating mechanism.

15. A steerable walking machine as claimed in claim 14 wherein the flexible legs controlled by the first leg operating mechanism are equally spaced around the leg mechanism.

16. A steerable walking machine as claimed in claim 14 wherein the leg mechanism comprises two or more flexible legs the operation of which is controlled by a second leg operating mechanism.

17. A steerable walking machine as claimed in claim 16 wherein the flexible legs controlled by the second leg operating mechanism are equally spaced around the leg mechanism.

18. A steerable walking machine as claimed in claim 16 wherein the flexible legs controlled by the first and second leg operating mechanism are located alternatively around the leg mechanism.

19. A steerable walking machine as claimed in claim 16 wherein the second leg operating mechanism acts to rotate a surface engaging end of the flexible legs.

20. A steerable walking machine as claimed in claim 19 wherein the rotation of the surface engaging ends of the flexible legs provided by the first and second leg operating mechanisms are of the same sense.

21. A steerable walking machine as claimed in claim 19 wherein the rotation of the surface engaging ends of the flexible legs provided by the first and second leg operating mechanisms are half of one cycle out of step with each other.

22. A steerable walking machine as claimed in claim 16 wherein the first and second leg operating mechanisms are driven by the first motor.

23. A steerable walking machine as claimed in claim 14 wherein the first leg operating mechanism acts to rotate a surface engaging end of the flexible legs.

24. A steerable walking machine as claimed in claim 1 wherein the leg mechanism comprises three flexible legs the operation of which is controlled by a first leg operating mechanism.

25. A steerable walking machine as claimed in claim 24 wherein the leg mechanism comprises three flexible legs the operation of which is controlled by a second leg operating mechanism.

* * * * *